United States Patent [19]

Shope

[11] Patent Number: 4,951,263
[45] Date of Patent: Aug. 21, 1990

[54] SPREAD SPECTRUM UNDERWATER LOCATION BEACON SYSTEM

[75] Inventor: Steven M. Shope, Corrales, N. Mex.

[73] Assignee: Sandia Research Associates, Inc., Corrales, N. Mex.

[21] Appl. No.: 382,210

[22] Filed: Jul. 20, 1989

[51] Int. Cl.$^5$ .............................................. H04B 1/59
[52] U.S. Cl. ...................................... 367/2; 367/117; 367/134; 367/135; 367/137
[58] Field of Search .................... 367/2, 6, 117, 131, 367/134, 135, 137

[56] References Cited

U.S. PATENT DOCUMENTS

| | | | |
|---|---|---|---|
| 3,900,823 | 8/1975 | Sokal et al. | 455/126 |
| 3,992,692 | 11/1976 | Filer | 367/137 |
| 4,081,784 | 3/1978 | Wilson et al. | 367/94 |
| 4,109,100 | 8/1978 | Unkauf | 455/303 |
| 4,847,817 | 7/1989 | Au et al. | 367/175 |

Primary Examiner—Charles T. Jordan
Assistant Examiner—J. Woodrow Eldred
Attorney, Agent, or Firm—James Creighton Wray

[57] ABSTRACT

An underwater location beacon emits a continuous wave signal which is phase-shift modulated by a pseudo-noise, spread spectrum code. This signal is detected with an exact replica of the transmitted code. To an unauthorized observer without the replica, the transponder's signal is indistinguishable from background ocean noise. The spread spectrum code allows extraction of the signal from high levels of ocean noise, providing an increased detection range, jamming resistance, covertness, and unique signals for each pinger. The outputs of the surface spread spectrum receiver are used with automated location algorithms. Several receivers at different surface positions provide the underwater coordinates of the pinger's location.

19 Claims, 5 Drawing Sheets

FIG. 1

PRIOR ART

SPREAD SPECTRUM UNDERWATER LOCATION BEACON SYSTEM

BACKGROUND OF THE INVENTION

1. Field of the Invention

This invention generally describes new methods and apparatus to detect and locate devices underwater. Specifically, this invention relates to an underwater location system comprising an underwater beacon apparatus which emits signals and a receiver apparatus which is capable of detecting the beacon signals and locating the underwater beacon.

2. Prior Art

Conventional underwater location devices, or pingers, emit periodic acoustic pulses. Hand-held, towed, or ship-mounted underwater location device (ULD) receivers are used to locate the pinger's position. The pulsed signal has limited range, is subject to distortion, and is difficult to locate using the existing receivers. Historically, the major use of underwater location devices (ULDs), has been for aircraft flight recorders. The Federal Aviation Agency (FAA) established the rules, FAR 25.1457(g)(3), 25.1459(d)(3), 121.343(f), and 121.359(c)(2)(iii), that cockpit voice and flight data recorders carried aboard most commercial aircraft must have an approved underwater location device attached. To be an acceptable ULD, an acoustic beacon must meet the specifications outlined in FAA Advisory Circular AC-21-10A. These standards were developed and are continually reviewed by a special committee of the Society of Automotive Engineers (SAE - Committee A-4). Advisory Circular AC-21-10A specifies that the ULD must emit a repeating acoustic pulse. The pulse rate is approximately one pulse per second. The beacon, once activated by water immersion, must operate continuously for a minimum of 30 days. Experience during past recovery operations has shown the range of the current conventional ULD design to be approximately one mile.

Unfortunately, even with acoustic beacons attached, underwater objects are not always located when situated in large bodies of water. Recent examples include KAL Flight 007, a widebodied aircraft, which plunged into the Sea of Japan on the night of Aug. 31, 1983. The flight data recorders were never recovered from this highly-publicized incident. The flight data and cockpit voice recorders were eventually recovered from the wreckage of Air India's Flight 182, a Boeing 747, that apparently exploded over the North Atlantic on June 23, 1985. Although the crash site of the Air India plane was localized to a five-square-mile area, it took searchers, representing the efforts of six nations, over two weeks to locate the recorders. The recorders were found at a depth of 6,700 feet. In 1974, TWA's Flight 841 was sabotaged over the Ionian Sea. A nearby aircrew witnessed Flight 841's rapid descent and disintegration. This eye-witness account allowed an accurate position-estimate of the crash site. Although the flight recorder contained an acoustic beacon and the crash site was known, it still took 27 days of searching by the U.S. Sixth Fleet to locate the beacon's acoustic signal. Note that the operating life of the beacon may be only 30 days. The conventional type of pinger which is used on flight recorders offers no security against unauthorized location or intentional jamming efforts such as may have happened at the KAL accident site.

Pingers are also used to locate torpedoes in underwater test and practice ranges. Before being delivered to the Navy, every new torpedo is test-fired at least once at a practice range. Sometimes these torpedoes are lost during the course of a test. This is a serious problem. Recovery of an advanced torpedo by a foreign government not only compromises the technology in the weapon, but can render an entire weapon system susceptible to foreign countermeasures. The search and recovery operations used to retrieve these torpedoes can be expensive and time-consuming. Underwater location devices are often placed on the torpedoes for the practice shots. The ULDs can greatly assist the location efforts.

Two common uses of ULDs have been described. Pingers have been employed in other Government and commercial applications. These include:
Space Nuclear Power Systems During Launch
Other Space Launches, i.e. Space Shuttle & Cargo
Classified Material Transport
Military Salvage Operations
Nuclear Weapon Transport
Military Flight Recorders
Missile Test Firings
Naval Mine Operations
Downed Airman Beacons
Military Aircraft
Commercial uses include:
Commercial Space Payloads
Marine Salvage
Ocean Research
Marine Mammal Studies Underwater acoustic pingers are manufactured by a variety of U.S. companies. The Dukane Corporation's Seacom Division, located in St. Charles, Ill., is a dominant company in the world market. Other manufacturers include Data Sonics, Inc., Sonatech, Inc., and EFCOM Subsea Technology.

Most pingers are cylindrical in shape. Typical dimensions for flight recorder applications are 1.25 inches in diameter and 3.8 inches long. The flight recorder ULDs can survive crash forces of 6000 g's (0.5 ms) and ocean depths of 20,000 feet. A small contact pad on one end of a pinger is shorted by salt or fresh water contact. This activates the beacon. Including the battery, the device weighs approximately 9 ounces.

The conventional pingers, which are attached to flight recorders, emit a 9 millisecond pulse of a 37.5 Khz carrier. The pulse is repeated every 1.1 seconds. The pinger's output is a finite-lengthened wavetrain. SAE Aerospace Standard AS-8045 stipulates that the minimum acoustic source strength of location pingers must be 160.5 dB (re:1 micro-Pa). Different pinger strengths, frequencies and pulse lengths are also used in the other pinger applications.

As the signal radiates from a submerged underwater beacon, energy is lost due to both geometrical divergence (spreading) and the intrinsic attenuation of seawater. At the receiver, the signal is detected along with the background acoustic noise of the ocean.

If the ocean were noise free, it would be possible to detect the pinger's signal at great ranges. Likewise, if the underwater beacon had no power restrictions, a large source strength could be used to overcome ocean noise interference. However, because the oceans are noisy and the ULDs are power limited, it is generally not possible to detect isolated pulses over ranges greater than approximately one mile. The basic problem is that the signal level rapidly falls below the ocean noise level, and the pulses become undetectable.

Problems remain and necessities exists to improve detectability of pinger signals and to provide longer detection ranges. An improved detection range would mean quicker locations, lower-cost search operations, and a higher probability-of-detection. In airplane accident investigations, recovery of the flight recorders is often essential for establishing the cause of the accident. When large areas must be searched, heretofore unattainable longer detection ranges are critical. Longer operating times then currently available may be extremely important.

SUMMARY OF THE INVENTION

The present invention solves existing problems in known underwater location devices and systems by providing processed signal techniques to improve detectability and to increase detection ranges.

Unfortunately, signal processing gains are not readily feasible using a pulsed signal. Process gains are possible, however, with other types of signal modulation. In this invention, the conventional pulsed signal is replaced with a unique spread spectrum signal. The periodic pulse is replaced with a continuous carrier which is phase-shift modulated (PSK) by a repeating, maximal-length, binary sequence. The binary sequence has characteristics similar to random noise, which can be unique for each pinger. In spread spectrum terminology, this is known as direct sequencing. The spread spectrum signal modulates the underwater acoustic beacon. The spread spectrum processing technique is frequency independent and can be applied to beacons of any frequency.

Spread spectrum modulation basically spreads out a pulse in the time-domain, while reducing the pulse bandwidth and amplitude in the frequency-domain. The receiver compresses this time sequence back into a pulse, hence the often-used term of pulse compression. Spread spectrum modulation has statistical properties similar to random noise and is commonly called pseudonoise (PN) modulation. Because of the low power density inherent in spread spectrum modulation, recovery of baseband information from the spread spectrum signal can be accomplished only through correlating the received signal (plus noise) with an exact replica of the transmitted signal. The spread spectrum receiver uses non-coherent demodulation, matched filtering, and stacking to detect the known signal buried in noise. This signal processing method permits signal detection in high noise environments. The ability to extract a signal from dominating noise conditions permits a combination of extended detection ranges and longer beacon operating lives.

The maximal-length binary sequences, also known as m-sequences, are generated using tapped, feedback shift-registers. A chip is the fundamental unit of the sequence and can be either a one or a zero. A typical sequence length for this application is 255 chips. The carrier is phase-shift modulated (PSK) by this sequence. Each chip is represented by many cycles of the carrier wave.

The complexity of the underwater pinger of the invention remains similar to that of existing ULDs. However, the receiver complexity is increased to accommodate the spread spectrum signal processing equipment. System performance is increased at the expense of a more complex receiver design.

The following advantages are offered by the spread spectrum pinger of the present invention:

The present invention provides covert location signals. Because the pinger signal can be transmitted at very low power levels, the signals can be intentionally buried in ambient noise at distances greater than several hundred yards from the pinger. With conventional ULDs, the signal is readily detectable by anyone within a one mile radius of the ULD. Unfriendly groups could reach a recovery site prior to the arrival of authorized personnel. The spread signal is resistant to unauthorized detection, even when the frequency is known, because the spread spectrum codes, which are needed for signal recovery, can be kept secret.

The present invention is jam resistant. The noise-like properties of the direct-sequence spread spectrum signals make jamming extremely difficult, even when an adversary knows the frequency of the beacon. Recovery of the KAL 007 flight recorders may have been severely hampered by intentional acoustic jamming.

The present location system is distortion free. The ducting and refractive effects of ocean layers can cause frequency-dependent acoustic velocities. Under these conditions, a broadband signal such as an impulse will experience severe distortion. A spread spectrum signal resists distortion due to its narrow bandwidth and the removal of multi-path effects.

Increased range is a benefit of the present system. Because spread spectrum receivers can recover signals from noise, the detection range is greatly extended. Conventional devices have a maximum range of approximately one mile. A multi-fold increase in the detection range with the spread spectrum pinger may be expected.

This invention is interference resistant. An additional benefit of the jam-proof properties of the spread spectrum pinger is that multiple beacons will not interfere with one another. Because each pinger has a unique code sequence and these codes are orthogonal to one another, each pinger can be detected and located individually. This is ideal for crash sites which may contain multiple beacons.

The present system is compatible with location algorithms. The time-difference-of-arrival of the signal between multiple receivers can be used to calculate the pinger's x,y and z coordinates. The output of a receiver's matched filter is a relative time-of-arrival and can be used in a location algorithm. Similar algorithms have been developed for the seismic location of trapped miners.

The spread spectrum ULDs have a physical similarity to existing pingers. The size of the spread spectrum pingers is similar to existing underwater pingers.

The system has three major components: the underwater beacon, the SMS surface receiver, and the location technique.

The underwater beacon of the present invention uses a single carrier frequency. As an example, the carrier frequency may be anywhere in the range between 100 HZ and 100 Khz. The beacon transmits a set of spread spectrum sequences. Each sequence is identical. Repetition begins as soon as the previous sequence is complete. The number of sequences in a set can vary from a few to an infinite continuous sequence transmission.

Each sequence is a binary, pseudo-noise string of chips. The chip is the fundamental unit of a sequence and can be a one (1) or a zero (0). Preferably, the number of chips in a sequence is $(2^n - 1)$, with n being the number of stages in the shift register. Typically n is between 6 and 12 (a 63 to 4095 chip sequence respectively). Preferably, the number of ones in the sequence exceeds the number of zeros by one (i.e. j+1 ones and j zeros). The generation of these maximal-length sequences is well known and is documented in numerous studies.

Each chip of a sequence is represented by many cycles of the continuous carrier wave. We generally use 124 cycles of the carrier per chip. The change from a "1" chip to a "0" chip is represented by a phase change in the carrier. Although a phaseshift of 180 degrees is commonly used, a phase-shift of 172.8 degrees provides even better results in the receiver processing. If two adjacent chips are identical, e.g. both "0"s, then no phase-shift takes place.

In the spread spectrum receiver, the signal is detected with a conventional underwater acoustic transducer commonly known as a hydrophone. A bandpass filter removes out-of-band noise. A preamplifier provides the correct signal with ambient noise levels to an analog to digital A/D converter.

The signal is digitized at a rate which is at least twice the carrier frequency. The present invention typically uses an A/D conversion rate that is four times the carrier frequency. The remaining receiver functions are done in software with the following functions:

The digitized values are demodulated to obtain both in-phase (I) and quadrature (Q) components. The in-phase demodulate is obtained by forming the sum of the first sample of each cycle for i cycles, then forming the sum of the third sample for the same i cycles, and subtracting the two sums. Similarly, a quadrature demodulate is formed by subtracting the sum of i second samples from the sum of i fourth samples. Usually, four in-phase and four quadrature demodulates per chip are formed. This defines the value of i. For example, if there are 128 cycles per chip, and four in-phase and four quadrature demodulates per chip, i would be 32.

A matched filter uses a replica of the binary sequence used by the pinger modulator. The matched filter is applied to the demodulated signal on a sliding basis. When four demodulates per chip are used, the matched filter slides at $\frac{1}{4}$ chip increments.

The in-phase and quadrature outputs from the matched filter are squared and summed together. These values are stacked, with one stack period equal to the sequence length, to provide even more signal to noise ratio, SNR, enhancement.

The terms detection and location are differentiated herein. Detection is the process of detecting a pinger signal. Location is the process of using the pinger signal to locate the pinger. Location is accomplished in two different ways. Most commonly, directional transducers are used to locate the pinger.

However, the output of the spread spectrum receiver provides relative time-of-arrival (TOA). TOA techniques can be used with a computerized location algorithm. A series of ship-based, sonobuoy, or shore-based receivers simultaneously detect the signal. The time-difference-of-arrival of the signals on matched-filter outputs between the different receiver locations are used to accurately calculate the pinger's underwater position to within a few feet. Simultaneous matched filter outputs may be formed from the signals received at different observation stations. The location algorithm can utilize inhomogeneous ocean velocities when calculating the pinger location For example, the effects of underwater sound layers or velocity profiles, if known, will not affect the location accuracy.

The spread spectrum underwater location beacon can be configured into a variety of devices. The several configurations are included in the invention.

In water-activated beacons the spread spectrum beacon can be packaged in a manner similar to the conventional ULDs. The device is activated by water immersion and operates for a predetermined time. An optional time delay provides a time lapse between switch closure and transmitter activation. In airplane crashes, the time delay gives search and recovery personnel time to arrive at the accident site.

The present system may be used as a transponder, that is, an underwater location beacon that lies dormant until activated. In the present configuration, the transponder lies dormant until a valid activation code is received. The activation signal is acoustically transmitted from a nearby search and recovery vessel, aircraft, sonobuoy, or shore station. In the listen mode, the transponder can lie dormant for extended periods of time, for example years, with minimal battery drain. The activation code can be kept secret and can be unique to each transponder. When the transponder receives a valid activation signal, it switches to the transmit, or response, mode. The transponder responds with the spread spectrum code described above. Utilizing the spread spectrum receiver, along with knowledge of the transponder's unique spread spectrum code, the receiver located on a recovery vessel detects this signal. Otherwise, the signal appears as random noise and is indistinguishable from ocean noise.

When transmitted by the search and recovery operations, the activation signal to the transponder will consist of a simultaneous or serialized transmission of 16 discrete frequencies. Mr. Ray Lovelady, of the NASA Langley Research Center, has developed a transponder which is activated in this fashion. The presence of a particular frequency indicates a binary "1", while the absence of a frequency represents a binary "0". In this scheme, 16-bit words are transmitted to the transponder. The cryptographic code that is used to activate the transponder consists of a serial sequence of these 16-bit words. Each transponder will have a changeable, but unique, activation code. The length and complexity of the code may be adjusted. There is provided a cryptographic code which is strong enough to withstand unauthorized activation attempts, yet which permits a relatively simple and compact transponder design. Even if an adversary recorded the code, it would be useless against future recovery efforts, assuming the same code was not used again. A cryptographic scheme developed by Adleman and Rivest in 1978 appears to be well suited for underwater transponder activation.

Although the example of a simple activation code has been used, the activation code should really be called a command code. In addition to activation, the code can also be used to control other transponder functions such as source strength, transmit period, turn-off, transmit frequency, etc.

An object of the present invention is to provide an underwater location beacon which emits a continuous wave CW signal which is phase-shift modulated by a pseudo-noise, spread spectrum code. Detecting this signal requires an exact replica of the transmitted code. To an unauthorized observer without the replica, the pinger's signal is indistinguishable from background ocean noise. The main benefit of the spread spectrum code is the ability to extract the signal from high levels of ocean noise. This relates to an increased detection range, jamming resistance, covertness, and unique signals for each pinger. The output of the surface spread spectrum receiver can be used with automated location algorithms. Using several receivers at different surface positions, a computer is used to calculate the underwater coordinates of the pinger's location.

An underwater location system of the present invention comprises an underwater beacon and a receiver. The beacon apparatus includes a housing and an attachment which attaches the housing to a device to be located underwater. An oscillator sequence generator and modulator are contained in the electronic module which is mounted in the housing. An oscillator is mounted in the housing for producing a continuous wave signal. A modulator in the housing selectively phase-shifts the continuous wave signal. A sequence generator mounted in the housing and connected to the modulator controls the sequence of phase-shifts by the modulator. A driver is connected to the electronics module for receiving signals from the modulator and producing signals of sufficient power to drive a transducer assembly. A transducer assembly is mounted in the housing and is connected to the driver for receiving signals from the driver and transducing the signals to sound signals produced in the water in which the housing is located.

The sequence generator of the underwater location beacon apparatus includes a spread spectrum signal generator for controlling the modulator with a pseudo-noise, spread spectrum code for controlling phase-shifts by the modulator on the continuous wave output of the oscillator to spread out a pulse in time in reduced bandwidth and amplitude.

Preferably the underwater location beacon system includes a receiver for receiving the sound waves in the water. The receiver has a detector for detecting the sound waves and for converting the sound waves into electronic signals. A preamplifier connected to the detector preamplifies the electronic signals from the detector. A bandpass filter connected to the preamplifier eliminates noise in frequencies outside a beacon frequency. An analog-to-digital converter connected to the bandpass filter converts signals from the bandpass filter in the beacon frequency to digital signals.

A microprocessor demodulates the digital information from the converter to obtain components of the beacon frequency signal. A matched filter matches the modulation sequence produced by the beacon.

Preferably a second matched filter compares demodulated signals, and first and second squarers square matched filter outputs, which are summed together. Summed signals are stacked for one sequence length, providing enhanced signal-to-noise ratio. The stacked signals are displayed.

Preferably the system includes second, third and fourth receiver stations identical to the first-mentioned receiver. The display is connected to display stacked outputs of the second, third and fourth surface receivers.

The preferred system further includes the underwater location beacon constructed in a remotely-controlled configuration. Such a configuration is also known as a transponder. A command receiver in the spread spectrum transponder housing will control the oscillator, modulator, sequence generator, driver, and transducer in response to command signals from the command transmitter mounted in one of the surface receivers. The transponder's command receiver will consist of a transducer (which can be the same as the beacon transducer) for receiving the command signals, a preamplifier, a filter, a multi-channel frequency decoder, and a function selector. The multi-channel frequency decoder senses the presence or absence of a particular command frequency (one of sixteen for example). If the command frequency is present, the decoder issues a digital "1" to the function selector. If the frequency if absent, the decoder issues a digital "0" to the function selector. The function selector interprets the combination of many "1"s and "0"s and controls the appropriate operation of the beacon.

The preferred method of locating an underwater device comprises generating a continuous wave signal, generating a spread spectrum code, phase-shift modulating the continuous wave signal according to the spread spectrum code, driving a transducer with the phase-shift modulated continuous wave signal, and creating phase-shift modulated sound signals of a predetermined frequency.

The preferred method further repeats the spread spectrum code sequence and repeats the sound signals sequence, thereby repeating maximal length binary sequences a predetermined number of times.

The method may repeat the spread spectrum code and sound signal sequences continuously.

The preferred method of the present invention preferably phase-shift modulates a continuous wave with predetermined pseudo-noise.

The preferred method phase-shifts the continuous wave signal at other than 180°.

Preferably the method of locating an underwater device further comprises detecting the continuous frequency sound signal and converting the sound signal into an electronic signal, amplifying the electronic signal, removing unwanted frequencies from the electronic signal, converting the remaining electronic signal to a digital information signal, demodulating the digital information signal to obtain in-phase and quadrature components of the digital signal, applying the demodulated signal to a matched filter which uses a replica of the spread spectrum code in the beacon, and enhancing the matched signal and displaying the signal.

The method of locating an underwater device further comprises supplying the demodulated components to plural matched filters, squaring and summing outputs of the matched filters, and stacking the summed output, recording the summed output, and displaying the stacked sum output as an indication of location of the underwater beacon.

These and further objects and features of the invention are apparent in the disclosure which includes the above and ongoing specification, with the claims, and the drawings.

DETAILED DESCRIPTION OF THE DRAWINGS

Figure 1:
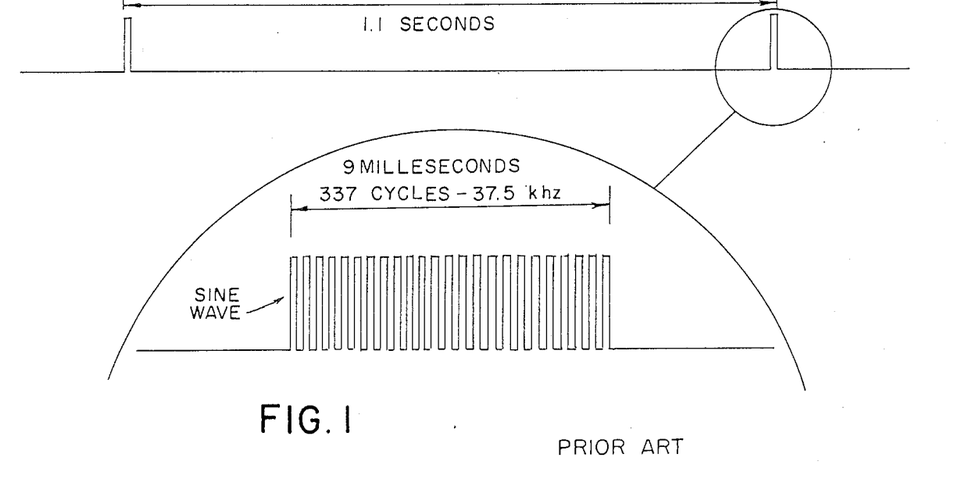
FIG. 1 shows the pulsed output from a conventional pinger.

Referring to FIG. 1, prior art underwater location beacons usually use a finited-lengthed continuous wave (CW) signal with a predetermined frequency. The finite-lengthed groups of oscillations are periodically repeated; prior art uses approximately 1.1 groups per second. The signal frequency within each group of oscillations is approximately 37.5 Khz for prior art. Each group of oscillations contains approximately 337 cycles of the signal frequency. The length of each group of oscillations is approximately 9 milliseconds for prior art.

Figure 2:
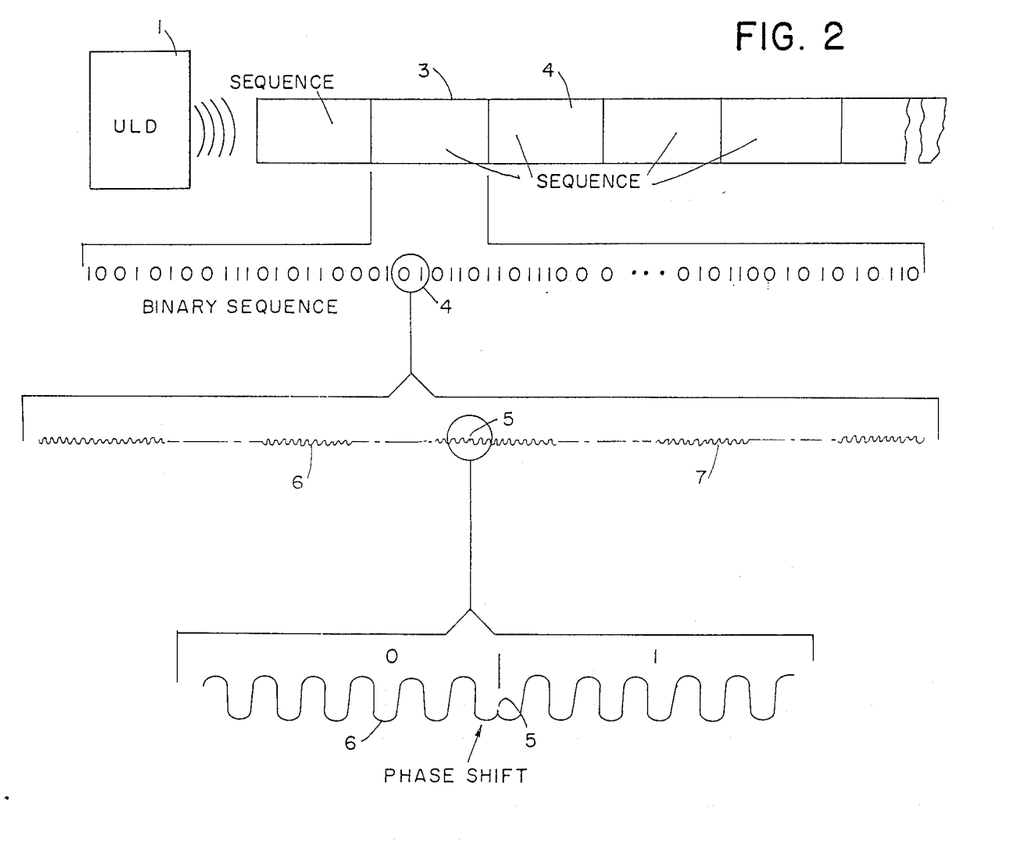
FIG. 2 shows spread spectrum direct sequencing.

Referring to FIG. 2, the present invention, an underwater location device, 1 in the drawings, continuously repeats 3 a number of binary sequences 4. The binary sequences are broadcast from the underwater location device as phase-shifts 5 in a carrier wave 6 to produce a phase-shifted wave 7 which continues until the next phase-shift.

Any phase-shift, including a 180° phase-shift, is suitable, however phase-shifts other than 180°, for example 172.5°, are preferred.

Figure 3:
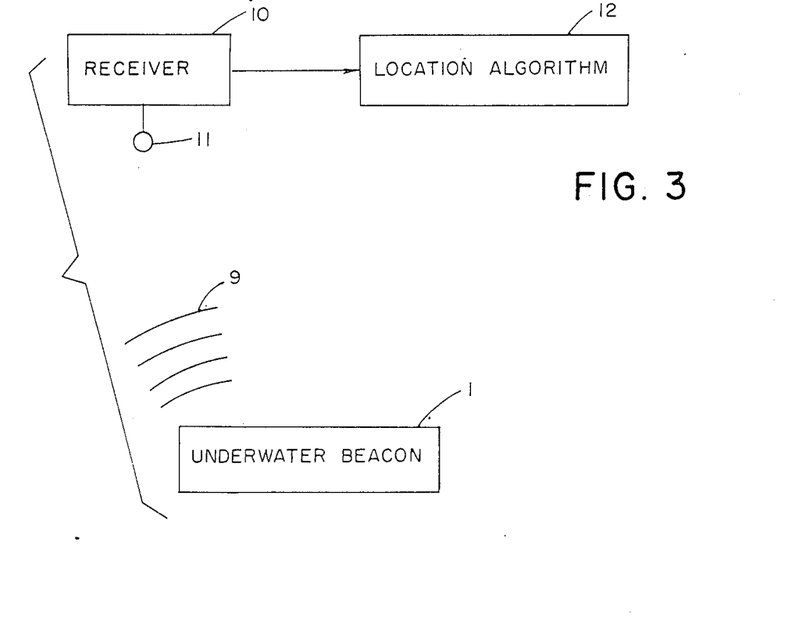
FIG. 3 is a block diagram of the overall system.

As shown in FIG. 3, the basic system uses an underwater beacon 1 which broadcasts a sound signal 9 to a detector 11 associated with a receiver 10. The receiver 10 provides a location algorithm 12.

Figure 4:
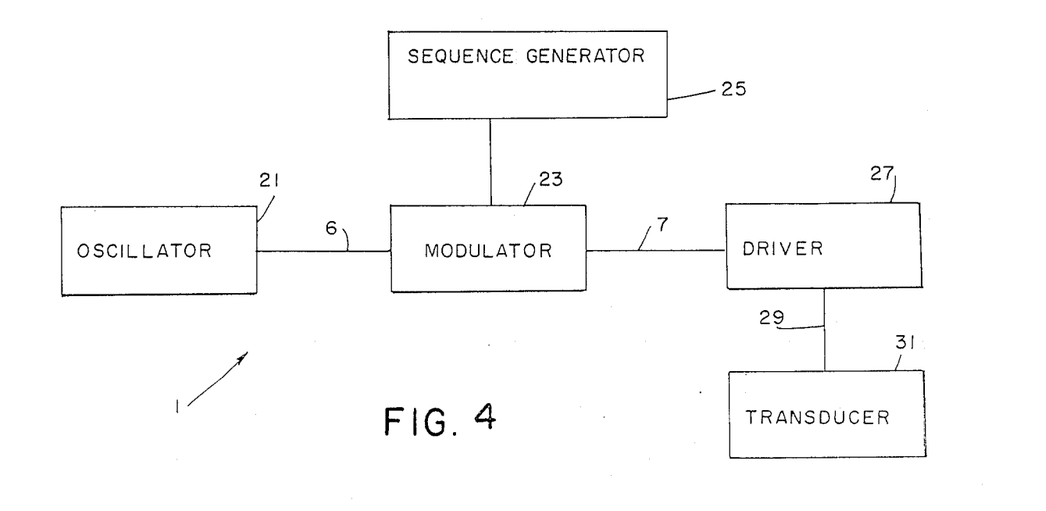
FIG. 4 is a functional diagram of the beacon transmitter.

As shown in FIG. 4, the underwater location device beacon generally indicated by the number 1 has an oscillator 21 and a modulator 23, which is controlled by a sequence generator 25. The oscillator 21 produces the continuous wave signal 6 which is phase-shifted by the modulator 23 to a phase-shifted signal 7 as controlled by the sequence generator. A driver 27 amplifies the phase-shift coded continuous wave signal 7 into a driver signal 29 with a frequency phase-shift code, which drives a transducer 31 to produce soundwaves of a predetermined frequency with the phase-shift coding.

Figure 5:
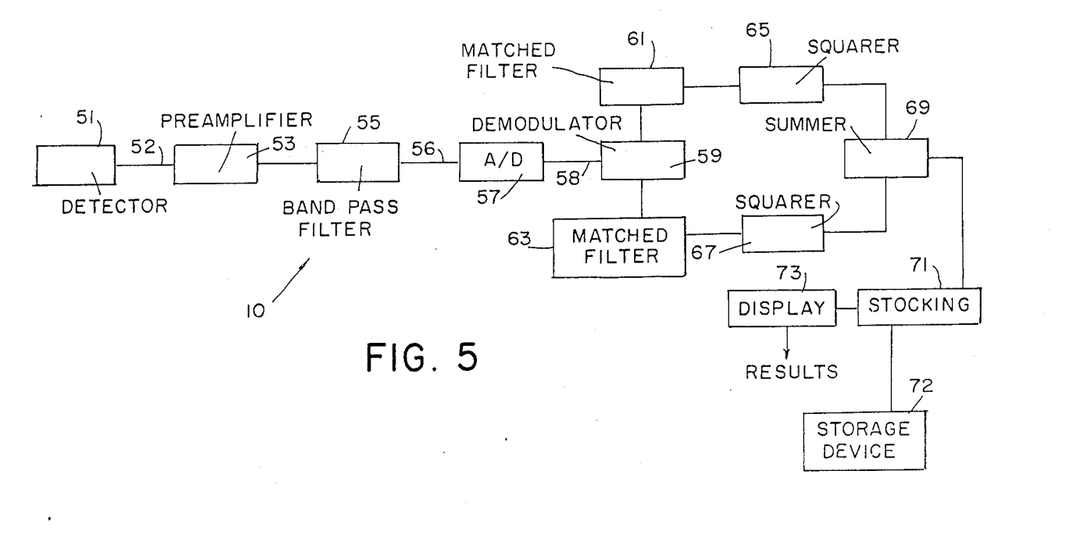
FIG. 5 is a functional diagram of a surface spread spectrum receiver.
Figure 6:
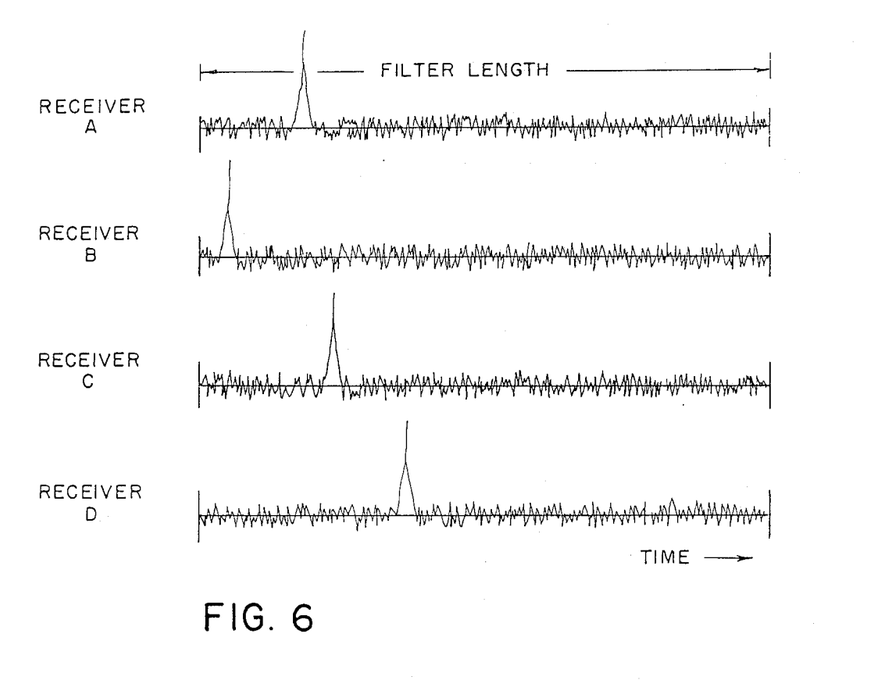
FIG. 6 shows stacked, matched filter output from several measurement stations.

As shown in FIG. 5, the receiver 10 includes a detector 51 which detects sound signals in a desired range of frequencies and converts these signals to an electronic signal 52. The preamplifier 53 supplies amplified signals to a bandpass filter 55 which removes frequencies which are not in the frequency of the beacon. The beacon frequencies 56 are passed to an analog digital converter which converts the signal to a digital signal 58. The digital signal 58 is demodulated, 59, and is supplied to matched filters 61 and 63, which use the same spread spectrum code used by the generator in the beacon to determine matches in the phase-shifts coded pulses. The results are provided to squarers 65 and 67, and the results of the squarers are provided to a summer 69. The output of the summer 69 is provided to a stacker 71, which stacks all inputs from an entire sequence length 4 as shown in FIG. 1, and displays the stacked results as enhanced pulses in a CRT 73 or other display device (plotter, printer, etc.) as shown in FIG. 6. The stacked results can also be recorded in a storage device 72.

Figure 7:
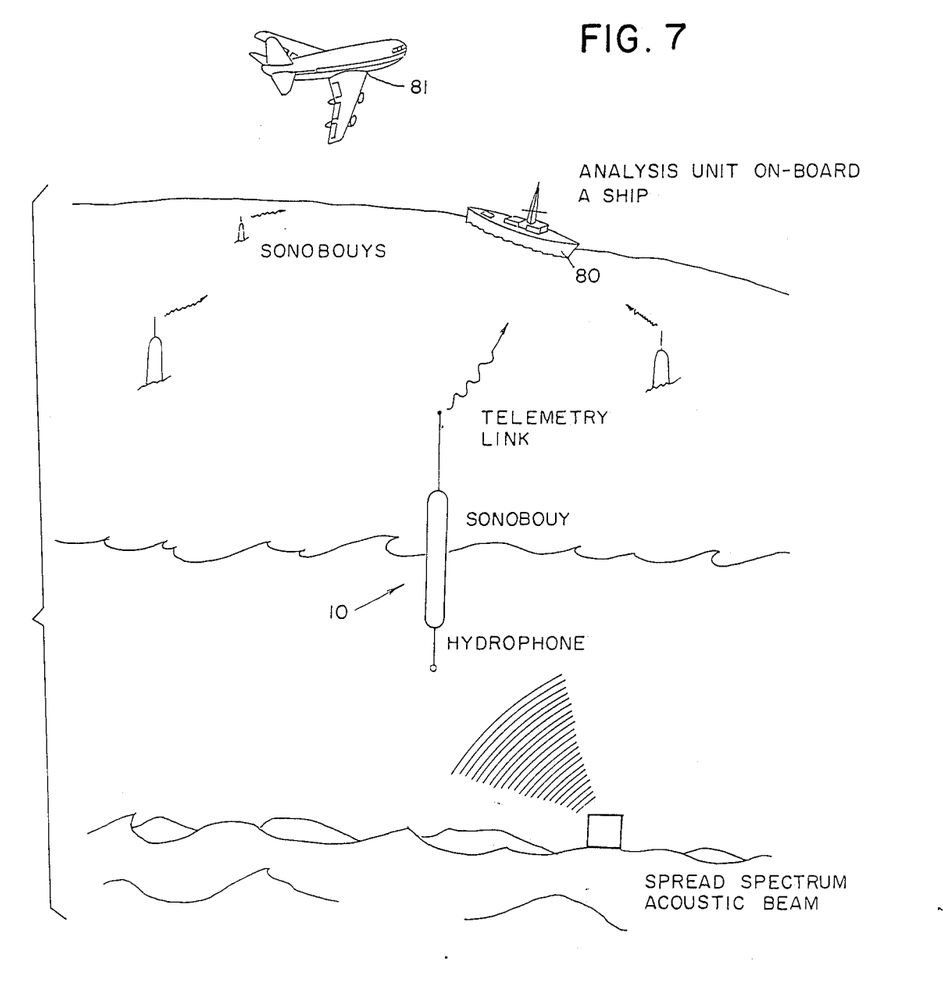
FIG. 7 schematically represents a location technique using several measurement stations.

As shown in FIGS. 6 and 7, several spaced receivers 10, such as in sonobuoys, may be linked by telemetry or cables for analysis aboard a ship 80, or aircraft 81.

Figure 8:
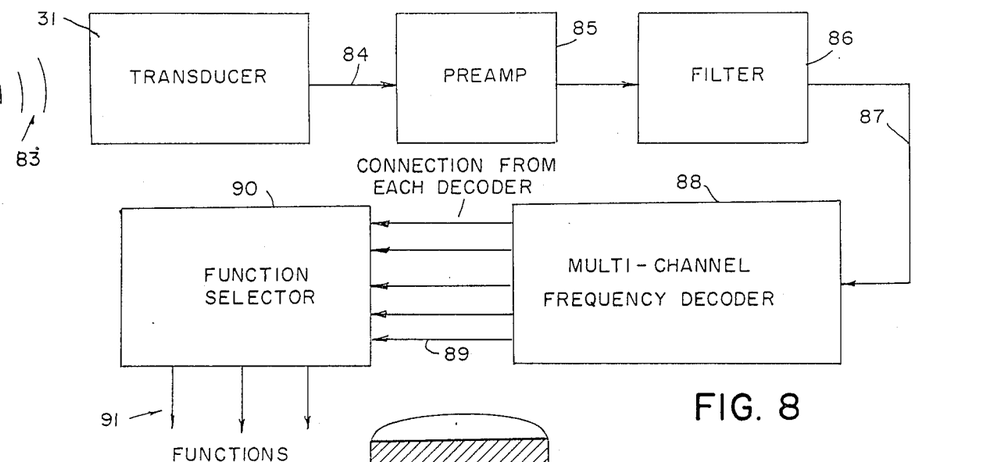
FIG. 8 is a functional diagram of the command receiver housed in the underwater beacon.

As shown in FIG. 8, a command receiver consists of a transducer 31, which converts the multi-frequency acoustic signals 83 to electric signals 84. The signals 84 are preamplified by amplifier 85, and are then filtered by bandpass filter 86. The filtered signals 87 are provided to a multi-channel frequency decoder 88. The multi-channel frequency decoder senses the presence or absence of a particular command frequency (one of sixteen for example). If the command frequency is present, the decoder issues a digital "1" to the function selector. If the frequency is absent, the decoder issues a digital "0" to the function selector. The output of the decoder is a set of parallel digital signals 89, which are provided to the function selector 90. The function selector interprets the combination of many "1"s and "0"s from connection 89 and controls the appropriate components in the beacon with function control signals 91.

Figure 9:
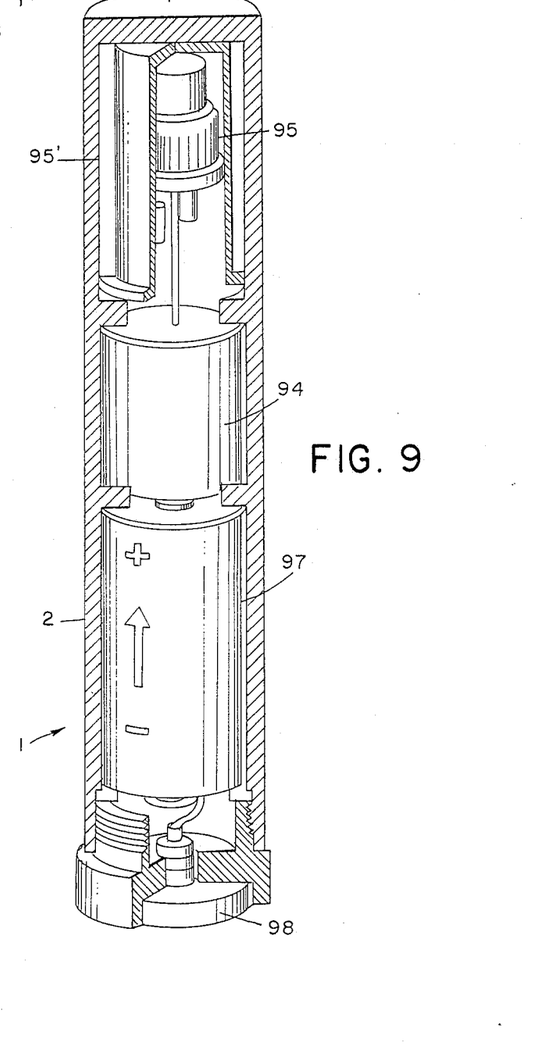
FIG. 9 shows a cutaway of an embodiment of the beacon.

FIG. 9 shows an embodiment of the underwater location device 1. The underwater location device 1 includes a housing case 2, and an attachment 92 for attaching the housing to the underwater location device. An oscillator, sequence generator, modulator and driver are contained in the electronic module 94 which is mounted in the housing 2. The driver connected to the electronics module receives signals from the modulator and produces signals of sufficient power to drive transducer assembly 95, 95'. The transducer assembly 95, 95' is mounted in the case 2 and is connected to the driver for receiving signals from the driver and transducing the signals to sound signals produced in the water through the case 2. Also within this housing is a battery 97 and water switch 98. Water switch 98 is activated by salt or fresh water contact and turns on the underwater location device 1.

While the invention has been described with reference to specific embodiments, modifications and variations may be made without departing from the scope of the invention, which is defined in the following claims.

I claim:

1. Underwater location system, comprising:
   an underwater beacon apparatus having a housing, an attachment for attaching the housing to a device to be located underwater, an oscillator mounted in the housing for producing a continuous wave signal, a modulator connected to the housing for selectively phase-shifting the continuous wave signal, a sequence generator mounted in the housing and connected to the modulator for controlling the sequence of phase-shifts by the modulator, a driver connected to the modulator for receiving signals from the modulator and producing signals of sufficient power to drive a transducer, a transducer mounted in the housing and connected to the driver for receiving signals from the driver and transducing the signals to sound signals in water in which the apparatus is located; and
   a receiver for receiving the sound signals in the water, the receiver having a detector for detecting the sound waves and for converting the sound waves into electronic signals, a preamplifier connected to the detector for preamplifying the electronic signals from the detector, a bandpass filter connected to the preamplifier for eliminating noise in frequencies outside a beacon frequency, an analog to digital converter connected to the bandpass filter for converting signals from the bandpass filter in the beacon frequency to digital signals, a demodulator connected to the converter for demodulating the digital information from the converter for obtaining components of the beacon frequency signal and a matched filter for matching the modulation sequence produced by the beacon.

2. The underwater location system apparatus of claim 1, wherein the sequence generator of the beacon apparatus includes a spread spectrum signal generator for controlling the modulator with pseudo-random signal maximal-length, binary sequences in a spread spectrum code for controlling phase-shifts by the modulator on the continuous wave output of the oscillator to spread out a pulse in time and to reduce bandwidth and amplitude.

3. The system of claim 1 wherein the receiver further comprises a second matched filter connected to the demodulator, first and second squarers respectively connected to the first mentioned matched filter and to the second matched filter for squaring results of the matched filters, a summer connected to the first and second squarers for summing together results of the first and second squarers, a stacker connected to the summer for stacking together the summed signals for one sequence length, for providing enhanced signal-to-noise ratio, a display connected to the stacker for displaying the stacked signal, and a storage device for recording the results.

4. The system of claim 1 further comprising second, third and fourth receivers identical to the first-mentioned receiver, and wherein the display is connected to display stacked outputs of the second, third and fourth receivers.

5. The system of claim 1, wherein the surface receiver apparatus further has a transmitter mounted in the receiver for transmitting command signals; and the beacon apparatus further has a command signal receiver for controlling the oscillator, modulator, sequence generator, driver and transducer in response to the command signals from the transmitter in the receiver.

6. A receiver apparatus for detecting and locating an underwater beacon apparatus comprising a receiver for receiving sound waves in water from the underwater beacon apparatus, the receiver having a detector for detecting the sound waves and for converting the sound waves into electronic signals, a preamplifier connected to the detector for preamplifying the electronic signals from the detector, a bandpass filter connected to the preamplifier for eliminating noise in frequencies outside a beacon frequency, an analog to digital converter connected to the bandpass filter for converting signals from the bandpass filter in the beacon frequency to digital signals, a demodulator connected to the converter to demodulate the digital information from the converter to obtain components of the beacon frequency signal, a matched filter connected to the demodulator for matching the modulation sequence produced by the beacon.

7. The receiver apparatus of claim 6 comprising a second matched filter connected to the demodulator, first and second squarers respectively connected to the first mentioned matched filter and to the second matched filter for squaring outputs of the matched filters, a summer connected to the first and second squarers for summing together outputs of the first and second squarers, a stacker connected to the summer for stacking together the summed signals for one sequence length, for providing enhanced signal-to-noise ratio, and a display connected to the stacker for displaying the stacked signal.

8. The surface receiver apparatus of claim 6 comprising a transmitter mounted in the receiver for transmitting a command signal to a transponder having a housing, an oscillator, modulator, sequence generator, driver and transducer.

9. An underwater location beacon apparatus, comprising a housing, an attachment for attaching the housing to a device to be located underwater, an oscillator mounted in the housing for producing a continuous wave signal, a modulator for selectively phase-shifting the continuous wave signal, a sequence generator for controlling the sequence of phase-shifts by the modulator, a driver connected to the modulator for receiving signals from the modulator and producing signals of sufficient power to drive a transducer, a transducer mounted in the housing and connected to the driver for receiving signals from the driver and transducing the signals to sound signals in water in which the apparatus is located.

10. The underwater location beacon of claim 9, further comprising a command signal receiver in the housing for controlling the oscillator, modulator, sequence generator, driver and transducer in response to the command signals from a transmitter.

11. The method of detecting and locating an underwater device, comprising generating a continuous wave signal, generating a spread spectrum code, phase-shift modulating the continuous wave signal by inserting a predetermined pseudo-random signal into the continuous wave according to the spread spectrum code, driving a transducer with the phase-shift modulated continuous wave signal, and creating phase-shift modulated sound signals.

12. The underwater location method of claim 11 further comprising repeating the spread spectrum code and repeating the sound signals, thereby repeating maximal length binary sequences a predetermined number of times.

13. The method of claim 11 further comprising repeating the spread spectrum code and repeating the sound signals continuously.

14. The method of claim 11, wherein the phase-shifting comprises phase-shifting the continuous wave signal at other than 180°.

15. The method of claim 11 further comprising detecting the continuous frequency sound signal and converting the sound signal into an electronic signal, amplifying the electronic signal, removing unwanted frequencies from the electronic signal, converting the remaining electronic signal to a digital information signal, demodulating the digital information signal to obtain in-phase and quadrature components of the digital signal, applying the demodulated signal to a matched filter which uses a replica of the spread spectrum code, enhancing the matched signal and displaying the signal.

16. The method of claim 15 further comprising supplying the demodulated components to plural matched filters, squaring and summing outputs of the matched filters, stacking the summed output and displaying the stacked sum output as an indication of location of the underwater device.

17. The method of claim 16, where a single detector and receiver are used to detect the presence or absence of the underwater device in a defined area of an ocean.

18. The method of claim 16, wherein a receiver is connected to a plurality of detectors and individually processes the signals from each detector.

19. An underwater locator beacon, comprising a case, a transducer mounted in the case, a power supply mounted in the case, a water switch connected to the power supply to activate the beacon, and an electronics module connected to the power supply for supplying a spread spectrum phase-shifted continuous wave signal to the transducer for driving the transducer and producing a spread spectrum phase-shifted continuous wave sound signal from the transducer wherein the electronic module comprises an oscillator for producing a continuous wave, a modulator connected to an output of the processor for phase-shifting the continuous wave output of the oscillator, a sequence generator connected to the modulator for controlling the modulator with a pseudo-random signal, spread spectrum code, and a driver connected to the transducer for driving the transducer with the phase-shifted continuous wave.

* * * * *